United States Patent
Shavit et al.

(10) Patent No.: US 10,049,127 B1
(45) Date of Patent: Aug. 14, 2018

(54) META-TRANSACTIONAL SYNCHRONIZATION

(75) Inventors: Nir N. Shavit, Cambridge, MA (US); Maurice P. Herlihy, Brookline, MA (US)

(73) Assignee: Oracle America, Inc., Redwood City, CA (US)

(*) Notice: Subject to any disclaimer, the term of this patent is extended or adjusted under 35 U.S.C. 154(b) by 1887 days.

(21) Appl. No.: 10/995,885

(22) Filed: Nov. 23, 2004

Related U.S. Application Data

(60) Provisional application No. 60/531,121, filed on Dec. 19, 2003.

(51) Int. Cl.
*G06F 7/00* (2006.01)
*G06F 17/30* (2006.01)

(52) U.S. Cl.
CPC .............. *G06F 17/30362* (2013.01)

(58) Field of Classification Search
None
See application file for complete search history.

(56) References Cited

U.S. PATENT DOCUMENTS

| | | | |
|---|---|---|---|
| 4,584,640 A | | 4/1986 | MacGregor et al. |
| 4,847,754 A | | 7/1989 | Obermarck et al. |
| 5,224,215 A | | 6/1993 | Disbrow |
| 5,319,778 A | | 6/1994 | Catino |
| 5,428,761 A | | 6/1995 | Herlihy et al. |
| 5,692,178 A | * | 11/1997 | Shaughnessy .......... 707/8 |
| 5,832,484 A | * | 11/1998 | Sankaran et al. ............ 707/8 |
| 5,978,802 A | * | 11/1999 | Hurvig ................... 710/200 |
| 5,978,813 A | * | 11/1999 | Foltz et al. |
| 6,016,490 A | * | 1/2000 | Watanabe et al. .......... 707/8 |
| 6,041,384 A | * | 3/2000 | Waddington et al. ...... 710/200 |
| 6,128,710 A | | 10/2000 | Greenspan et al. |

(Continued)

FOREIGN PATENT DOCUMENTS

| | | |
|---|---|---|
| EP | 0 366 585 | 5/1990 |
| EP | 0 466 339 | 1/1992 |

(Continued)

OTHER PUBLICATIONS

Graham D. Parrington, Santosh K. Shrinastava, Stuart M. Wheater and Mark C. Little. The Design and Implementation of Arjuna, Summer 1995, vol. 8. No. 3, pp. 255-307.*

(Continued)

*Primary Examiner* — Thu Nga Nguyen
(74) *Attorney, Agent, or Firm* — Robert C. Kowert; Meyertons, Hood, Kivlin, Kowert & Goetzel, P.C.

(57) ABSTRACT

Efficiency with respect to traditional techniques is a key issue facing designers of software transactional synchronization mechanisms. Meta-transactional synchronization allows integration of transactional support into an object-oriented programming language, such as the Java language through the existing synchronization structure of the JVM. Meta-transactional synchronization provides source-level transactional operations that co-exist with synchronized operations. An implementation of a shared object in an object-oriented programming language tracks concurrently executing transactions attempting to access the shared object with at least one header word of the shared object.

28 Claims, 9 Drawing Sheets

(56) References Cited

U.S. PATENT DOCUMENTS

| | | | |
|---|---|---|---|
| 6,144,965 | A | 11/2000 | Olivier |
| 6,178,423 | B1 | 1/2001 | Douceur et al. |
| 6,195,685 | B1 * | 2/2001 | Mukherjee et al. ......... 709/205 |
| 6,247,025 | B1 * | 6/2001 | Bacon |
| 6,268,850 | B1 * | 7/2001 | Ng ............................... 715/866 |
| 6,360,219 | B1 * | 3/2002 | Brett et al. ....................... 707/8 |
| 6,360,220 | B1 | 3/2002 | Forin |
| 6,366,932 | B1 | 4/2002 | Christenson |
| 6,456,995 | B1 * | 9/2002 | Salo et al. .................... 707/703 |
| 6,581,063 | B1 | 6/2003 | Kirkman |
| 6,651,146 | B1 | 11/2003 | Srinivas et al. |
| 6,708,195 | B1 * | 3/2004 | Borman et al. ............... 718/102 |
| 6,826,757 | B2 | 11/2004 | Steele, Jr. et al. |
| 7,028,287 | B2 * | 4/2006 | Bak et al. ..................... 717/108 |
| 7,810,069 | B2 * | 10/2010 | Charisius et al. ............ 717/110 |
| 2001/0047361 | A1 | 11/2001 | Martin et al. |
| 2002/0087366 | A1 * | 7/2002 | Collier et al. ................... 705/5 |
| 2002/0138661 | A1 * | 9/2002 | Hayward ...................... 709/315 |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |
| 2004/0002975 | A1 * | 1/2004 | Scardo et al. ..................... 707/8 |
| 2004/0015510 | A1 | 1/2004 | Moir et al. |
| 2004/0015642 | A1 | 1/2004 | Moir et al. |
| 2004/0034673 | A1 | 2/2004 | Moir et al. |
| 2004/0054790 | A1 * | 3/2004 | Himmel et al. .............. 709/229 |
| 2004/0117372 | A1 * | 6/2004 | Kasman ........................... 707/9 |
| 2004/0153687 | A1 * | 8/2004 | Moir et al. ....................... 714/1 |
| 2004/0186825 | A1 * | 9/2004 | Dettinger et al. ............... 707/3 |
| 2005/0125406 | A1 * | 6/2005 | Cina ................................ 707/8 |
| 2005/0144170 | A1 * | 6/2005 | Wiser et al. ..................... 707/8 |
| 2008/0072238 | A1 * | 3/2008 | Monnie et al. ............... 719/310 |

FOREIGN PATENT DOCUMENTS

| | | |
|---|---|---|
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Afek, Yehuda, "Atomic Snapshots of Shared Memory," Journal of the ACM, vol. 40, No. 4, pp. 873-890, 1993.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," IEEE Transactions on Parallel and Distributed Systems, vol. 10, No. 12, pp. 1317-1332, 1999.

Bacon, David F. et al., "Thin Locks: Featherweight Synchronization for Java," ACM SIGPLAN Notices, vol. 33, No. 5, pp. 258-268, May 1998.

Dice, David, "Implementing Fast Java™ Monitors with Relaxed Locks," Proceedings of the USENIX JVM.01 Conference, Mar. 27, 2001.

Goodman, James R., et al., "Efficient Synchronization Primitives for Large-Scale Cache-Coherent Multiprocessors," Proceedings of the Third International Conference on Architectural Support for Programming Languages and Operating Systems, pp. 64-75, ACM Press, New York, NY 1989.

Harris, T., et al., 'Language Support for Lightweight Transactions,' Proc. 18th Annual ACM SIGPLAN Conf. on Object-Oriented Programming Systesm, Languages, and Applications, pp. 388-402, ACM Press, New York, NY, 2003.

Hendler, Danny, et al., "A Scalable Lock-Free Stack Algorithm," Proceedings of the 16th Annual ACM Symposium on Parallelism in Algorithms and Architectures, pp. 206-215, ACM Press, New York, NY, 2004.

Herlihy, M., et al., "Transactional Memory: Architectural Support for Lock-Free Data Structures," Proc. 20th International Symposium in Computer Architecture, pp. 289-300, IEEE Computer Society, Washington, D.C, 1993.

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," Proceedings of the 23rd International Conference on Distributed Computing, p. 522, IEEE Computer Society, Washington, D.C., 2003.

Luchangco, Victor et al., "Nonblocking k-compare-single-swap," Proceedings of the 15th Annual ACM Symposium on Parallel Algorithms and Architectures, pp. 314-323. ACM Press, New York, NY, 2003.

Mellor-Crummey, J., et al., Algorithms for Scalable Synchronization on Shared-Memory Multiprocessors, ACM Transactions on Computer Systems, vol. 9, No. 1, pp. 21-65, Feb. 1991.

Michael, Maged M. et al., "Non-Blocking Algorithms and Preemption Safe Locking on Multiprogrammed Shared Memory Multiprocessors," Journal of Parallel and Distributed Computing, vol. 51, No. 1, pp. 1-26, May 25, 1998.

Michael, Maged M. et al., "Safe Memory Reclamation for Dynamic Lock-Free Objects Using Atomic Reads and Writes," Proceedings of the 21st Annual ACM Symposium on the Principles of Distributed Computing, pp. 21-30, ACM Press, New York, NY, 2002.

Michael, M., "Scalable Lock-Free Dynamic Memory Allocation," Proceedings of the ACM SIGPLAN 2004 Conference on Programming Language Design and Implementation, pp. 35-46, ACM Press, New York, NY, 2004.

Moir, Mark et al., "Wait-Free Algorithms for Fast, Long-Lived Renaming," Science of Computer Programming, vol. 25, No. 1, pp. 1-39, Aug. 1995.

Moir, Mark, "Practical implementation of non-blocking synchronization primitives," Proceedings of the Sixteenth Annual ACM Symposium on Principles of Distributed Computing, pp. 219-228, ACM Press, New York, NY, 1997.

Moir, Mark, "Transparent Support for Wait-Free Transactions," Proceedings of the 11th International Workshop on Distributed Algorithms, pp. 305-319, Springer-Verlag, London, UK, 1997.

Moir, Mark, "Laziness Paysl Using Lazy Synchronization Mechanisms to Improve Non-Blocking Constructions," Proc. 19th Annual ACM Symposium on Principles of Distributed Computing, pp. 61-70, ACM Press, New York, NY, 2000.

Shavit, N., et al., "Software Transactional Memory," Distributed Computing, vol. 10, No. 2, pp. 99-116, Feb. 1997.

Goetz, Brian, "A First Look at JSR 166: Concurrency Utilities," Mar. 1, 2004. [URL: http://today.java.net/lpt/a/76].

Herlihy, M.P., et al., "Linearizability: A Correctness Condition for Con-Current Objects," ACM Transactions on Programming Languages and Systems, 12(3):463-492, Jul. 1990.

Herlihy, M.P., "Wait-Free Synchronization," ACM Transactions on Programming Languages and Systems, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 (retrieved from the Internet on Jul. 13, 2001: URL:ftp://ftp.cs.columbia.edu/reports/reports-1992/cucs-039-92.ps.gz).

Bershad, B. N., "Practical Considerations for Non-Blocking Concurrent Objects," Proceedings 13th IEEE International Conference on Distributed Computing Systems, pp. 264-273. IEEE Computer Society Press, Washington, D.C., 1993.

Herlihy, M., "A Methodology for Implementing Highly Concurrent Data Objects," ACM Transactions on Programming Languages and Systems, 15(5):745-770, Nov. 1993.

(56) References Cited

OTHER PUBLICATIONS

Attiya, Hagit, et al., "Are Wait-Free Algorithms Fast?" *Journal of the ACM*, 41(4):725-763, Jul. 1994.
Lamarca, A., "A performance evaluation of lock-free synchronization protocols," *Proceedings of the 13th Annual ACM Symposium on Principles of Distributed Computing*, pp. 130-140, ACM Press, New York, NY, 1994.
Michael, Maged M. et al., "Simple, Fast, and Practical Non-Blocking and Blocking Concurrent Queue Algorithms," Proceedings of PODC, pp. 267-275, May 1996.
Attiya, H., et al., "Universal Operations: Unary versus Binary," *Proceedings of the 15th Annual ACM Symposium on Principles of Distributed Computing*, pp. 223-232, ACM Press, New York, NY, 1996.
Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.
Afek, Y., et al., "Disentangling Multi-Object Operations," *Proceedings of the 16th Annual ACM Symposium on Principles of Distributed Computing*, pp. 111-120, Aug. 1997. Santa Barbara, CA.
Arora. N. S., et al., "Thread Scheduling for Multiprogrammed Multiprocessors," *Proceedings of the 10th Annual ACM Symposium on Parallel Algorithms and Architectures*, pp. 119-129, ACM Press, New York, NY, 1998.
Attiya, Hagit, et al., "Atomic Snapshots in O(n log n) Operations," *SIAM Journal on Computing*, 27(2):319-340. Apr. 1998.
Greenwald, M., "Non-Blocking Synchronization and System Design," PhD thesis, Stanford University Technical Report STAN-CS-TR-99/1624, Palo Alto, CA, Aug. 1999, 241 pages.
Agesen, Ole, et al.: "DCAS-Based Concurrent Deques," *SPAA 2000. Proceedings of the 12th Annual ACM Symposium on Parallel Algorithms and Architectures*, pp. 137 146. ACM Press, New York, NY, ISBN: 158113-185-2, 2000.
Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.
U.S. Appl. No. 09/547,288, filed Apr. 11, 2000 and naming as inventor(s) Shavit et al.
U.S. Appl. No. 09/547,290, filed Apr. 11, 2000 and naming as inventor(s) Shavit et al.
U.S. Appl. No. 09/710,218, filed Nov. 10, 2000 and naming as inventor(s) Harris, Timothy.
U.S. Appl. No. 09/837,671, filed Apr. 18, 2001 and naming as inventor(s) Detlefs et al.
U.S. Appl. No. 10/653,828, filed Sep. 3, 2003 and naming as inventor(s) Martin et al.
U.S. Appl. No. 10/669,948, filed Sep. 24, 2003 and naming as inventor(s) Dice et al.
U.S. Appl. No. 10/670,495, filed Sep. 24, 2003 and naming as inventor(s) Shavit et al.

\* cited by examiner

META-TRANSACTIONAL SYNCHRONIZATION

CROSS-REFERENCE TO RELATED PATENT APPLICATION

This non-provisional application is claims benefit under 35 U.S.C. § 119(e) of earlier filed provisional U.S. Patent Application No. 60/531,121 entitled "Meta-Transactional Support for Synchronization", filed on Dec. 19, 2003, naming as inventors Nir N. Shavit and Maurice Herlihy.

BACKGROUND

The present invention relates to the field of computers. More specifically, the present invention relates to concurrent access of data structures.

Synchronization mechanisms are utilized to implement concurrent access of an object. Some synchronization mechanisms include locking and transactional synchronization. Programs written in concurrent object-oriented languages frequently rely on locking for synchronization. A number of efficient mechanisms have been developed for object-level locking, such as described in *An Efficient Metalock for Implementing Ubiquitous Synchronization* by O. Agesen, D. Detlefs, A. Garthwaite, R. Knippel, Y. S. Ramakrishna, and D. White, which are used in the EVM Java® Virtual Machine, the Thin-Locks described in *Thin Locks: Featherweight Synchronization for Java* by D. F. Bacon, R. B. Konuru, C. Murthy, and M. J. Serrano, and the Relaxed-Locks described in *Implementing Fast Java Monitors with Relaxed Locks* by D. Dice. Recently, there has been interest in alternative synchronization structures, including transactional synchronization, such as described in *Transactional Memory: Architectural Support for Lock-Free Data Structures* by M. Herlihy and J. E. B. Moss. A transaction is a sequence of method calls that is executed atomically, that is, transactions appear to execute sequentially, in a one-at-a-time order. As a programming tool, transactions provide atomicity like critical sections, but without their added complexities.

Software transactional synchronization mechanisms have been proposed at the application level (as a collection of libraries) and at the level of individual memory accesses. However, an approach based on libraries can be cumbersome for a programmer. Low-level memory-access approaches that may benefit C programmers are poorly suited for object-oriented languages because each memory reference requires multiple low-level memory references which in turn take several expensive synchronization instructions each.

SUMMARY OF THE INVENTION

A technique has been discovered that facilitates non-blocking transactional synchronization at the source-level for an object-oriented programming language. Realizations of the described invention track concurrently executing transactions that are attempting to access a shared object, which is implemented in an object-oriented programming language. A header word of the shared object is utilized to track the transactions. This approach is easier to use than a collection of libraries, and is more efficient than memory-level techniques in the object-oriented language setting. Moreover, low-level techniques such as hardware transactions or hybrid transactions can be used to replace the use of locks in transactional synchronization to allow obstruction-free transactions.

In some embodiments, an application programming interface defines a source-level transactional method construct and a synchronization method construct for an object-oriented programming language and utilizes an object-level construct to support the source-level transactional method construct and the synchronization method construct, where the source-level transactional methods employ the object-level construct to indicate a set of one or more computations. In some embodiments, utilization of the object-level construct to support the transactional method construct comprises providing operations for writing into the object-level construct transaction activity information and the indications of computations corresponding thereto, and indicating the set of computation comprises referencing a data structure that identifies the set of computations. In some embodiments, the computations include executing transactions and executing synchronization methods. In some embodiments, the computations also include read-only executing transactions.

In some embodiments, each element of the data structure is encoded to indicate a computation type identifier field, a reference to status for a corresponding computation, a reference to a backup copy of the object, and a reference to a working copy of the object. In some embodiments, each element of the data structure also is encoded to indicate a list of read-only computations on the object. In some embodiments, the object-level construct indicates a first element of the data structure. In some embodiments, the object level construct also indicates a last element of the data structure. In some embodiments, the object-level construct includes header words. In some embodiments, the object-level construct is utilized for a locking mechanism. In some embodiments, the locking mechanism includes at least one of meta-locks, thin-locks, and relaxed-locks. In some embodiments, the programming language includes Java.

In some embodiments, the supported transactional method construct allows deadlock free multiple object transactions based on lower-level locking. In some embodiments, the definition of the transaction method construct is a definition of a source-level programming language construct for transaction based access of objects using the header words of objects. In some embodiments, the source-level transactional method construct also employs the object-level construct to indicate a lock state of an object. In some embodiments, the definition of the synchronization method construct defines a construction for synchronization methods that utilize lock monitor mechanisms implemented with the header word. In some embodiments, the synchronized method construct employs a blocking mechanism and the transactional method construct employs a non-blocking mechanism. In some embodiments, the application programming interface prioritizes methods in accordance with the synchronization method construct over methods in accordance with the transactional method construct.

These and other aspects of the described invention will be better described with reference to the Description of Embodiment(s) and accompanying Figures.

BRIEF DESCRIPTION OF THE DRAWINGS

FIG. 4A depicts an exemplary flowchart negotiating access to an object for SlowPath access. FIG. 4B depicts an exemplary flowchart for SlowPath access for meta-transactional synchronization that continues from FIG. 4A. FIG. 4C depicts an exemplary flowchart for SlowPath access for meta-transactional synchronization that continues from FIG. 4B.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, examples of the described invention are given within the context of Java® (Java and all Java-based marks and logos are trademarks or registered trademarks of Sun Microsystems, Inc. in the United States and other countries), although other object-oriented programming languages (e.g., Perl, Tcl-Tk, AppleScript, Visual Basic, Microsoft® CLR, Microsoft® .Net, etc.) can also be used to support transactions for a shared object. In other instances, well-known protocols, structures and techniques have not been shown in detail in order not to obscure the invention.

A technique for supporting a transactional synchronization mechanism in an object-oriented programming language is referred to herein as meta-transactional synchronization. Realizations of meta-transactional synchronization are implemented with or without locks.

Meta-Transactional Synchronization with Locks

Realizations of meta-transactions can be achieved with modifications to the Java Meta-lock to add transparent support for transactional synchronization. Modifications can be similarly applied to other object level locking mechanisms such as Thin-Locks and Relaxed-locks. Meta-transactions build on several of the mechanisms used in the transactional memory mechanism of *Software Transactional Memory for Dynamic-Sized Data Structures* by M. Herlihy, V. Luchangco, M. Moir, and W. N. Scherer N (hereinafter dynamic shared transactional memory or DSTM) in combination with meta-locking.

An exemplary realization is described in terms of the Exact VM (formerly called EVM and now called ResearchVM) meta-lock structure. A transaction is a sequence of operations on multiple objects. Each transaction has a status word that marks whether the transaction is committed, aborted, or active. One transaction can abort another by calling compare-and-swap to change the other's word from active to aborted. A transaction commits by calling compare-and-swap to change its own status word from active to committed. Before modifying an object for the first time, a transaction makes a shadow copy of the object and sets a pointer to a valid backup copy of the object. If the transaction commits, the updated shadow copy is the new object state and the backup copy is logically discarded. If it aborts, the object's original state can be restored from the backup, either by that transaction or by another.

Figure 1:
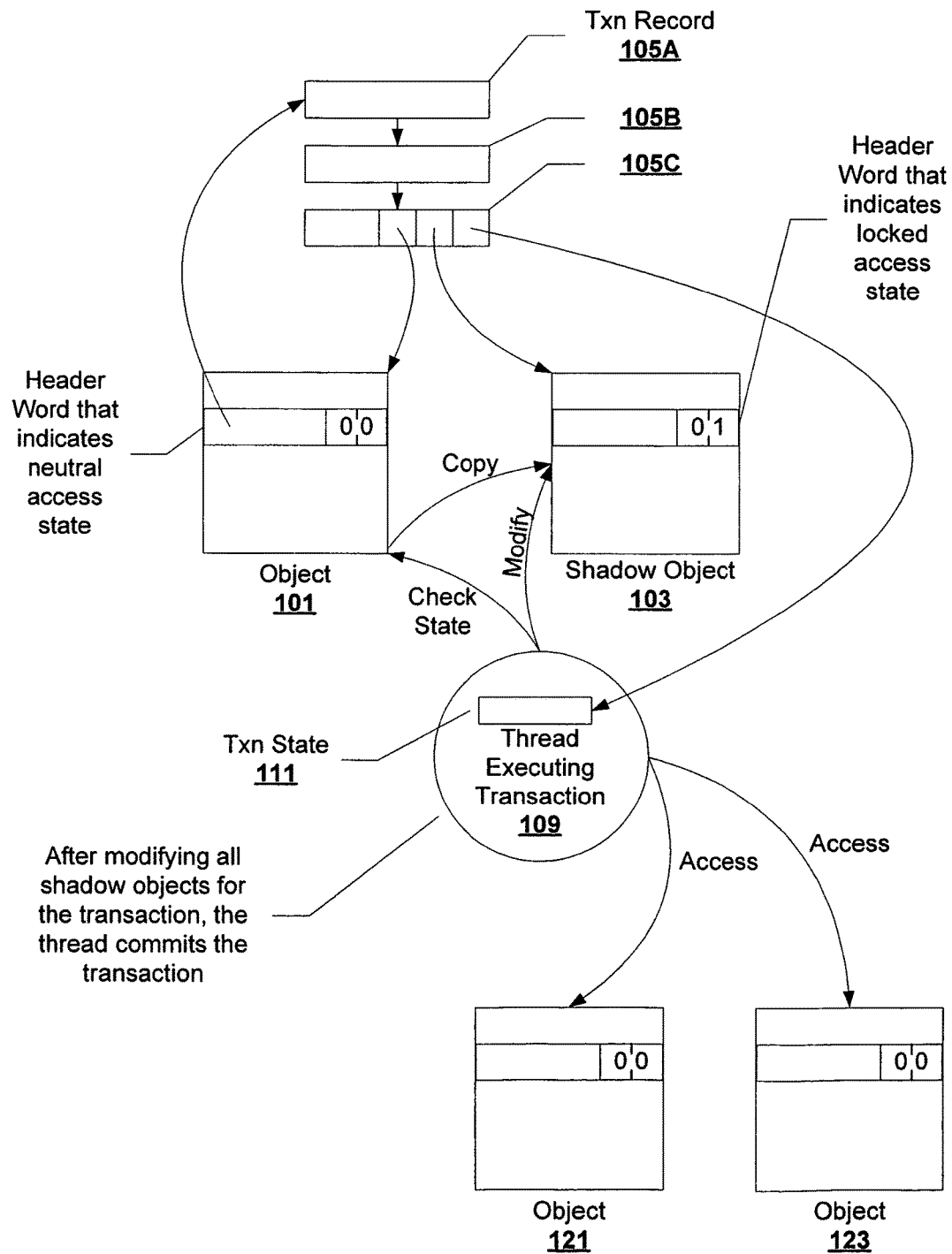
FIG. 1 depicts an exemplary illustration of a transactional synchronization utilizing meta-locking.

FIG. 1 depicts an exemplary illustration of a transactional synchronization utilizing meta-locking. A thread 109, executing a transaction, attempts to modify an object 101. When a transaction calls a method, it reads the current object access state, and constructs a transaction record (analogous to the meta-lock's synchronization record). The depicted transactional synchronization technique utilizes an adaptation of the meta-lock construct. As with meta-locks, one word in the object header is designated the "multi-use" word. The two low-order bits are used to indicate the access state of this word (i.e., state of the meta-lock for the object). The remaining bits can either hold a pointer, or other object-related information (such as the hash value or age). Realizations of the locking mechanism for meta-transactions, such as the meta-lock, can use the two-bit field to indicate the following values:

Neutral: the object is not being accessed.
Locked: the object is either locked by a synchronized method, or is being accessed by a transaction.
Waiters: the object is not currently locked by a synchronized method or accessed by a transaction, but there is a thread or transaction waiting to do so.
Busy: This is a transient state indicating that some thread holds the meta-lock.

Various realizations of the locking mechanism may utilize fewer or greater of the values for indicating access states to the object. The object 101 includes a header word (the multi-use word) that indicates a neutral access state. In the exemplary illustration depicted in FIG. 1, the neutral access state is indicated with a '00'. The header word references a set of transaction records 105A-105C. The transaction record 105C represents the thread 109, previously constructed by the thread 109 and included with the set of transactions records 105A-105B.

Figure 2:
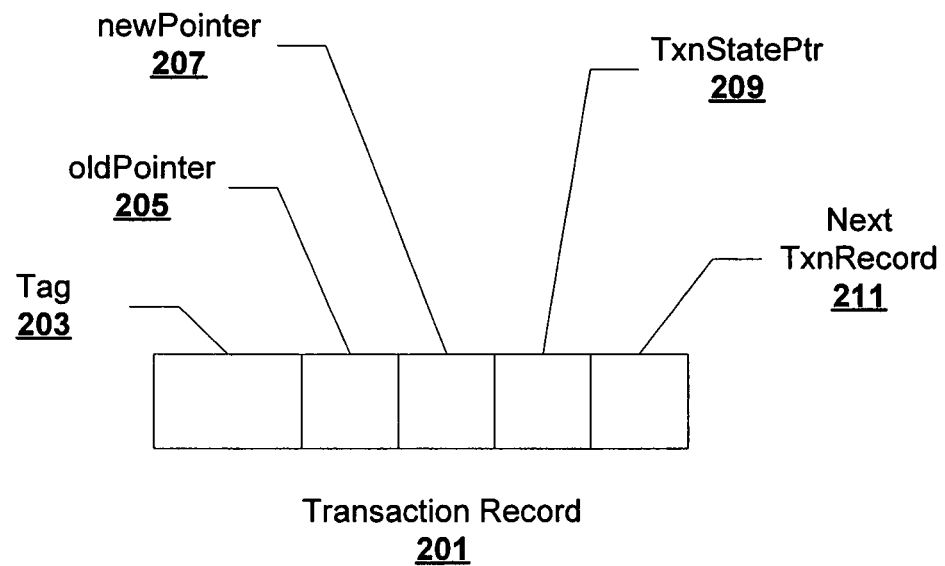
FIG. 2 depicts an exemplary transaction record.

FIG. 2 depicts an exemplary transaction record. A transaction record 201 includes 5 fields. The transaction record 201 includes the following information fields: a tag 203, an oldPointer field 205, a newPointer field 207, a TxnStatePtr 209, and a Next TxnRecord field 211. The information fields of the transaction record 201 indicate the following:

a. tag: a two-bit field indicating whether the record is a synchronized method, transaction, or a read transaction
b. TxnStatePtr: a reference to the transaction's status word.
c. oldPointer: a reference to an old (backup) copy of the object.
d. newPointer: a reference to a new working copy of the object.
e. NextTxnRecord: a reference to the next transaction record of the set of transaction records.

Of course, various realizations of a transaction record may include fewer or greater number of fields. For example, the transaction record may also include a Readers Pointer field that indicates a pointer to a list of read transactions on the object.

Referring again to FIG. 1, the tag for the transaction record 105C, although not shown, indicates that the record represents a transaction. The transaction record 105C also references a transaction state 111 indicated with the thread 109. The oldPointer of the transaction record 105C references the object 101. The thread 109 checks the access state of the object 101, determines that the access state is neutral, and then copies the object 101 and generates a shadow object 103. However, the access state in the header word of the shadow object 103 is set to indicate that the shadow object 103 is locked. In FIG. 1, the locked access state is indicated with '01'. After generating the shadow object 103, the thread 109 updates the transaction record 105C to reference the shadow object 103 with the newPointer field of the transaction record 105C. The thread 109 also accesses objects 121 and 123 as part of the transaction the thread 109 is executing. Although not illustrated, the thread 109 performs similar operations for the objects 121 and 123 as performed for the object 101. After modifying all of the shadow objects, assuming shadow objects were generated and modified for each accessed object, the thread 109 commits the transaction being executed.

Exemplary Realization of Meta-Transactional Synchronization

An exemplary realization of meta-transactional synchronization implemented with Java would provide extensions to the Java language. These extensions are described only to facilitate explanation, and there are many different ways the language could be extended to make use meta-transactional synchronization. An extension to the Java language would include a transactional keyword that modifies either a block of code or a method, in much the same way as the synchronized keyword (refinements, such as explicit support for read-only transactions, will be introduced later). The first time control enters a transactional block or method, a transaction is started. The transaction finishes when control leaves that block or method. If an object exports a transactional method, then all its methods are either synchronized or transactional, but not both. Any method marked synchronized retains its usual meaning. For simplicity, assume that all methods called from a transaction are themselves transactional. Furthermore, transactional blocks may be nested within synchronized blocks, and vice-versa.

An optimistic implementation of transactions is similar to the dynamic shared transactional memory (DSTM). The optimistic implementation utilizes several of the structural mechanisms of DSTM, and a control mechanism based on modifications to the existing Java Virtual Machine (JVM) locking structure. Low-level transactional mechanisms employ "hash" or "lookup" approaches to avoid dedicating a transactional bit per word. Object headers in most JVM implementations have free bits (actually, free words) available to mark the fact that an object is being accessed transactionally. This ability allows avoidance of the overhead of using numerous CAS operations to modify object state.

There are various transactional access modes to an object. A simple invariant can be maintained in case an object's multi-use word points to a list of records in its locked state. The invariant is as follows: 1) if the most recent method call was a synchronized method, then there are no transaction records in the list; 2) if the most recent method call was transactional, then the most recent transaction to open the object is the first in the list.

Exemplary pseudocode is provided to illustrate exemplary implementation of meta-transactional synchronization. The code includes two methods of accessing an object: 1) FastPath and 2) slowPath. FastPath implements an optimistic access of a shared object, with failover to slowPath. The following is pseudocode for FastPath meta-transactional synchronization access to an object.

```
With a new transRecord {
  If state of multiuseword==neutral then {
    oldPointer=object;
    CAS multiuseword to locked state pointing to transRecord;
    If CAS successful {
      newPointer=new objectCopy;
      Modify fields of the new object copy;
      Validate self;
    }
    else goto slowpath
  }
}
```

Continue to transact on other objects and commit transaction

Figure 3:
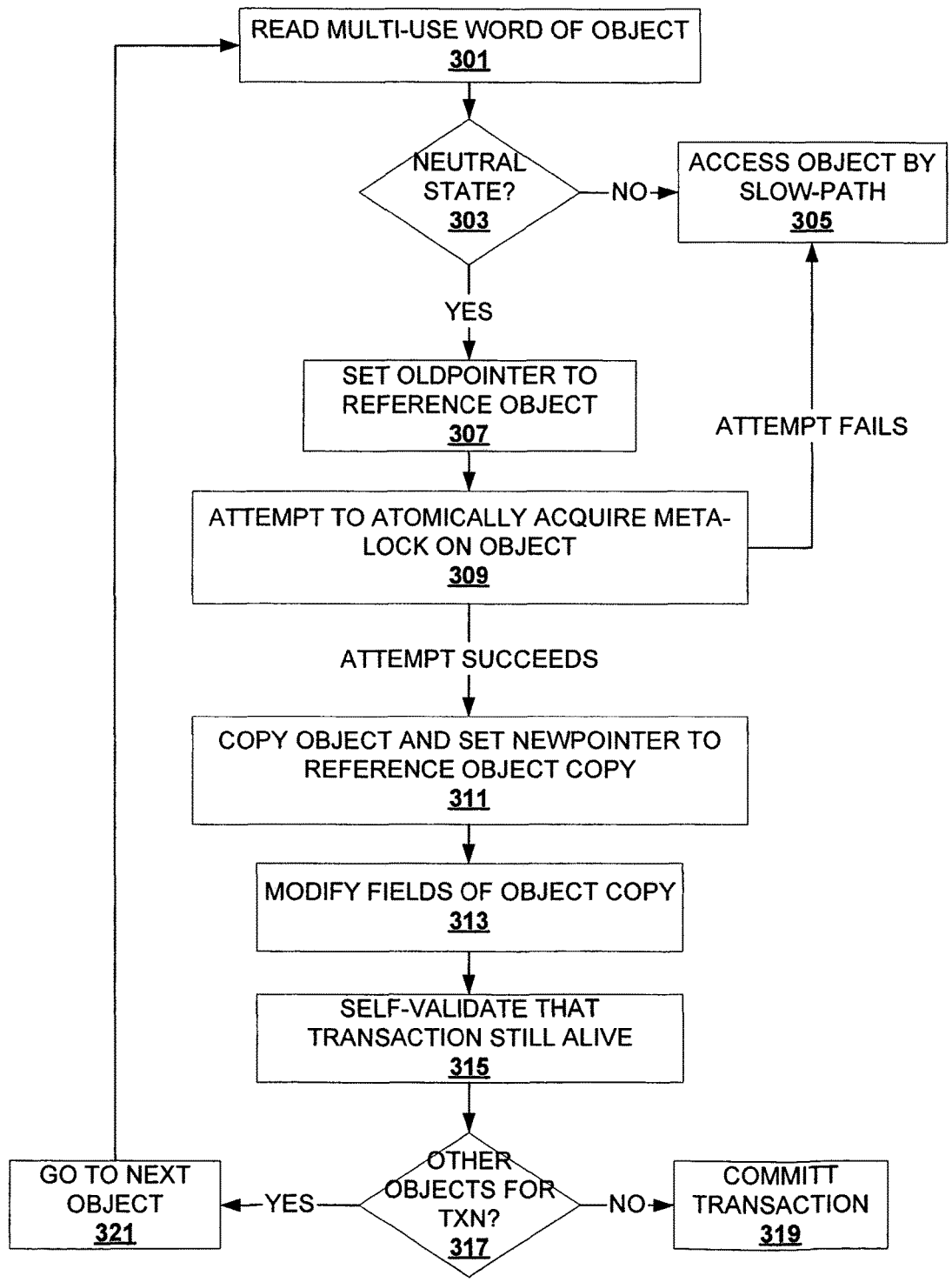
FIG. 3 depicts an exemplary flowchart for Fast Path access to an object for meta-transactional synchronization.

FIG. 3 depicts an exemplary flowchart for FastPath access to an object for meta-transactional synchronization. At block 301, a transaction optimistically reads the multi-use word of an object. At block 303, it is determined whether the multi-user word indicates a neutral state. If the multi-use word indicates a neutral access state, then control flows to block 307 and the transaction attempts FastPath access. If the multi-use word does not indicate a neutral access state, then control flows to block 305.

At block 305, the transaction attempts to slowpath access.

At block 307, the transaction points the oldPointer to the object itself. At block 309, the transaction attempts to atomically acquire a meta-lock on the object. For example, the transaction attempts to compare-and-swap the multi-use word to the locked state, where the remaining bits point to the transaction record. If the transaction acquires the meta-lock, then control flows to block 311. If the transaction fails to acquire the meta-lock, then control flows to block 305.

At block 311, the transaction copies the object and sets newPointer to reference the object copy. At block 313, the transaction modifies the fields of the object copy. At block 315, the transaction self-validates that it is still alive (i.e., determine whether the transaction has been aborted). This ensures that another transaction or synchronized method has not touched the object while it was being copied, which might cause the access state read into the object copy to be inconsistent. Since any such transaction or synchronized method touching the object would have had to see the current transaction's record in the meta-lock's list, the other transaction would abort the current transaction before touching the object. Hence, it is ensured that object copy is consistent by validating that the current transaction is still alive. At block 317, it is determined whether there are other objects to access for the transaction. If there are additional objects to access, then control flows to block 321. If there are no additional objects to access then control flows to block 319.

At block 319, the transaction is committed. Once the transaction has installed records in all its accessed objects, the transaction can commit.

At block 321, the transaction proceeds to the next object. Control flows from block 321 back to block 301.

If the transaction fails on the FastPath, then the object is potentially being accessed by other transactions or synchronized methods. The following is pseudocode for slowPath meta-transactional synchronization access which is initiated by failure of fast-path access.

```
With transRecord from failed fastpath {
  acquire (meta-lock);
  // wait until no synchronized methods active
  while (object held by synchronized method) {
    release (meta-lock);
    spin until multi-use word changes;
    acquire (meta-lock);
  }
```

Traverse list of transRecords starting from multiuseword;
Record active transactions in set
Append transRecord to end of list;
release (meta-lock);
while (some preceding transRecord in set is active) {
  for (each predecessor) {
    if (contention management policy)
      abort (predecessor);
    else
      spin for fixed duration;
  }
}
// all predecessors committed or aborted
// find committed version under lock
acquire (meta-lock);
validate self;
r=first transaction record in list;
if (r.transaction is aborted) {
  if (r.oldPointer==NULL) // predecessor never opened
    oldPointer=object;
  else // predecessor opened but aborted
    oldPointer=r.oldPointer;
} else {// predecessor opened and committed
  oldPointer=r.newPointer;
}
set multiuseword to my transRecord; // unlink predecessor
release (meta-lock))
newPointer*=oldPointer*; // copy old to new (outside lock)
validate self; // make sure copy is good
operate on newPointer*;
}
Continue to transact on other objects and commit transaction
}

Figure 4A:
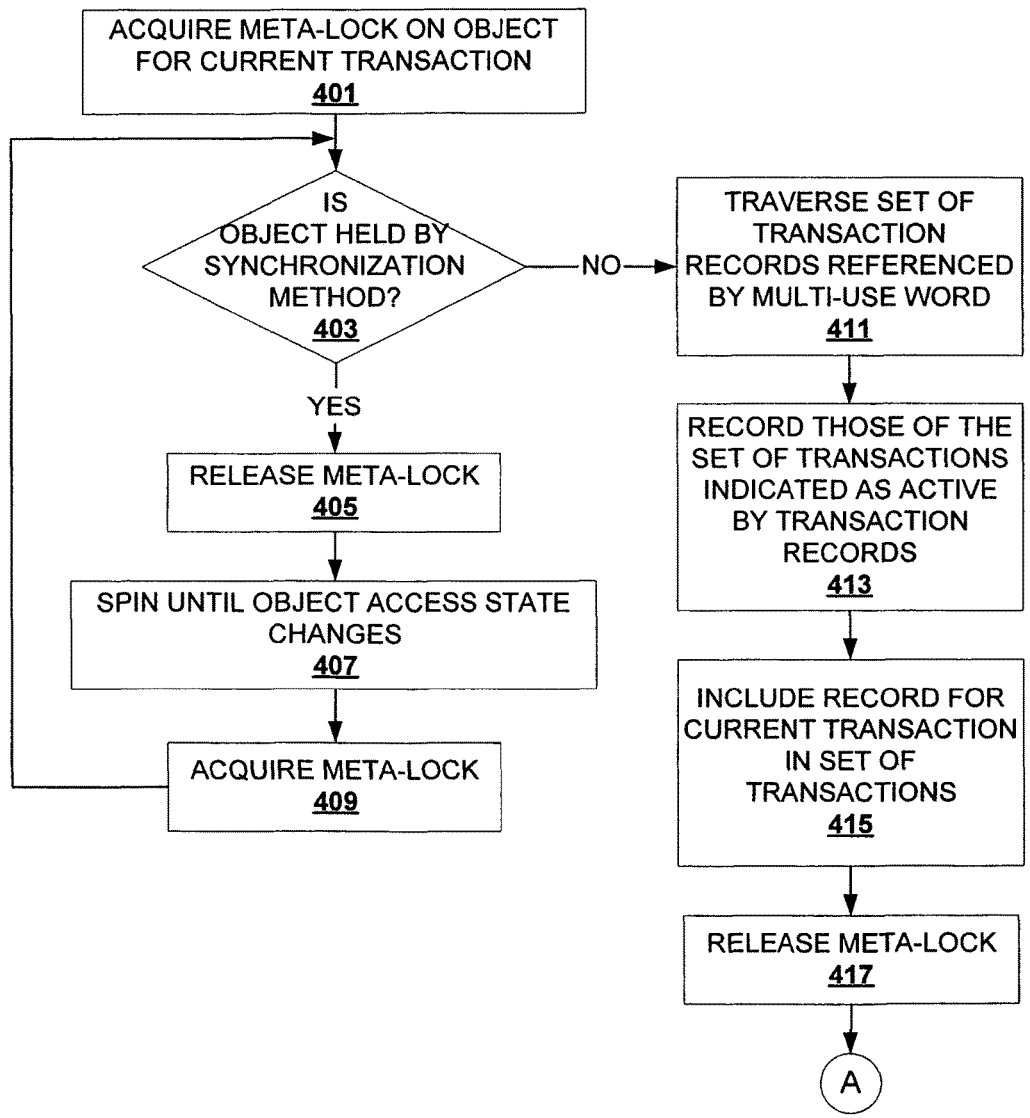
FIGS. 4A-4C depict exemplary flowcharts for SlowPath access to an object for meta-transactional synchronization.
Figure 4B:
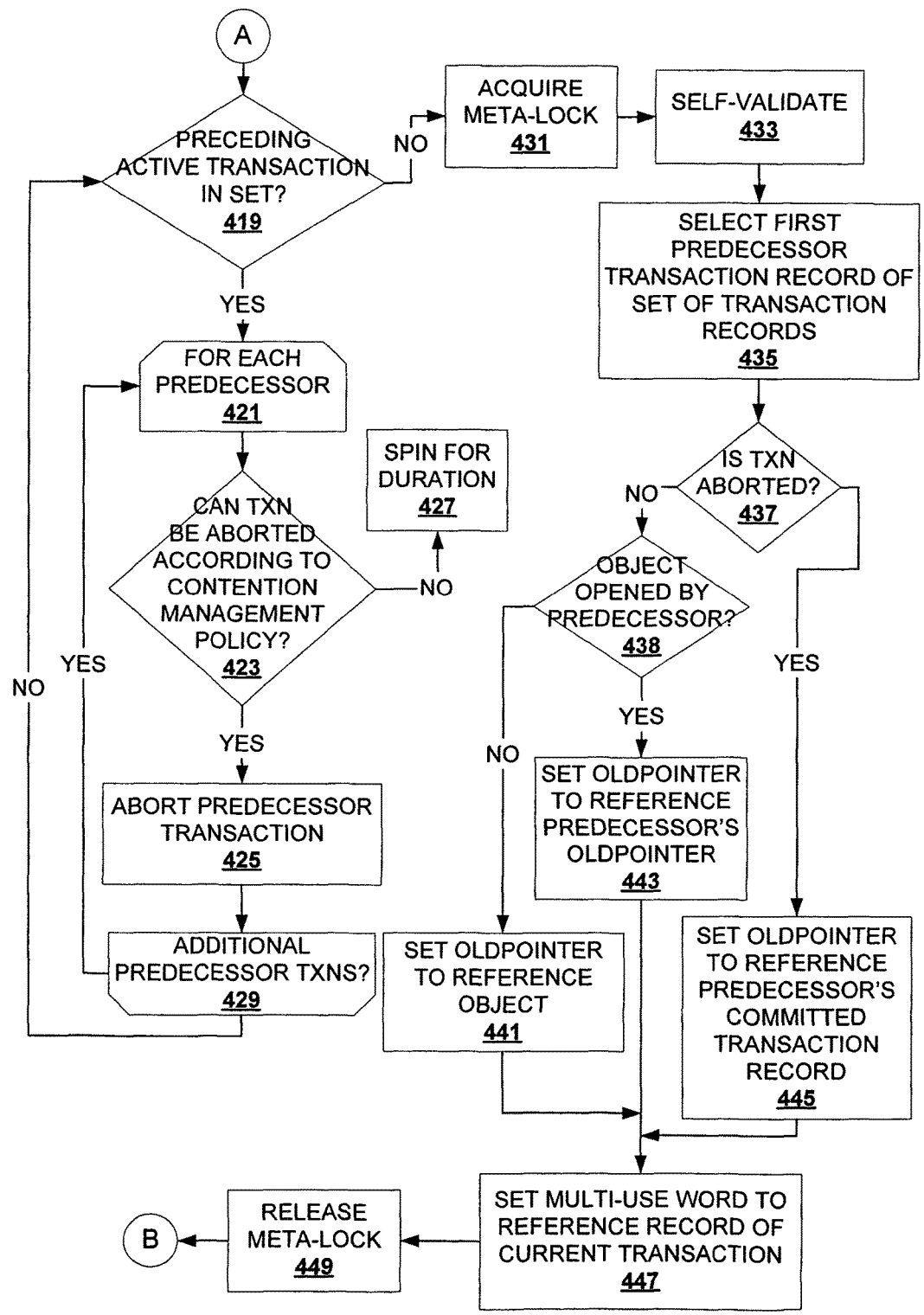
Figure 4C:
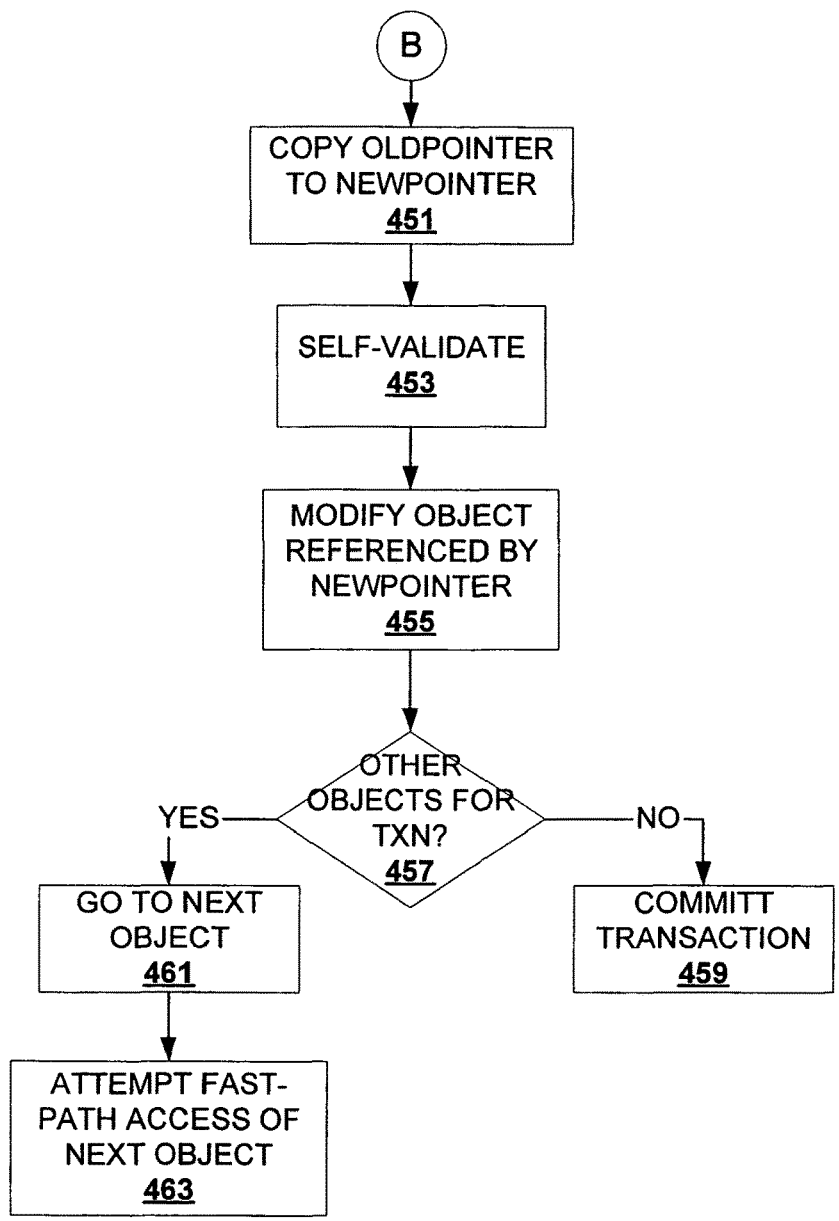

FIGS. 4A-4C depict exemplary flowcharts for slowPath access to an object for meta-transactional synchronization. FIG. 4A depicts an exemplary flowchart negotiating access to an object for slowPath access. At block 401, a meta-lock is acquired by a thread on an object for a current transaction. At block 403, it is determined whether the object is held by a synchronization method. If the object is held by a synchronization method, then control flows to block 405. If the object is not held by a synchronization method, then control flows to block 411.

At block 405, the acquired meta-lock is released by the current transaction. At block 407, the thread spins until the object's access state changes. At block 409, the thread acquires the meta-lock on the object again. Control flows from block 409 back to block 403.

At block 411, the thread traverses a set of transaction records referenced by the multi-use word of the object. At block 413, those of the set of transactions indicated as active by the transaction records are recorded. At block 415, a transaction record for the current transaction is included in the set of transaction records. At block 417, the thread releases the meta-lock.

FIG. 4B depicts an exemplary flowchart for slowPath access for meta-transactional synchronization that continues from FIG. 4A. At block 419, it is determined whether the set of transaction records indicates an active transaction that precedes the current transaction. If the set of transaction records indicates an active preceding transaction, then control flows to block 421. If the set of transaction records does not indicate an active preceding transaction, then control flows to block 431.

At block 421, a loop control loops through each transaction record that indicates an active predecessor transaction. At block 423, it is determined whether the indicated predecessor transaction can be aborted according to a contention management policy. If the predecessor transaction can be aborted, then control flows to block 425. If the predecessor transaction cannot be aborted, then control flows to block 427.

At block 427, the thread spins for a duration.

At block 425, the predecessor transaction is aborted. At block 429, it is determined whether there are additional transaction records that indicate active predecessor transactions. If there are such additional transaction records, then control flows back to block 421. If there are no such additional transaction records, then control flows back to block 419.

At block 431, a meta-lock is acquired. At block 433, the current transaction self-validates. At block 435, the first predecessor transaction record for the set of transaction records is selected. At block 437, it is determined whether the selected transaction has been aborted. If the selected transaction has been aborted, then control flows to block 445. If the selected transaction has not been aborted, then control flows to block 438.

At block 445, the oldPointer is set to reference the predecessor's committed transaction record. At block 447, the multi-use word is set to reference the record of the current transaction. At block 449, the meta-lock is released.

At block 438, it is determined whether the object has been opened by the selected predecessor transaction. If the object has been opened by the selected predecessor transaction, then control flows to block 443. If the object has not been opened by the selected predecessor transaction, then control flows to block 441.

At block 443, the oldPointer for the current transaction is set to reference the selected predecessor's oldPointer. Control flows from block 443 to block 447.

At block 441, the oldPointer for the current transaction is set to reference the object. Control flows from block 441 to block 447. Control flows from block 449 to block 451 of FIG. 4C.

FIG. 4C depicts an exemplary flowchart for SlowPath access for meta-transactional synchronization that continues from FIG. 4B. At block 451, the oldPointer of the current transaction is copied to the newPointer of the current transaction. At block 453, the current transaction self-validates. At block 455, the object referenced by the newPointer is modified. At block 457, it is determined whether the transaction will operate on additional objects. If there are additional objects for the transaction, then control flows to block 461. If there are no additional objects for the transaction, then control flows to block 459.

At block 461, the transaction proceeds to the next object. At block 463, the transaction attempts FastPath access of the next object.

At block 459, the transaction is committed.

In the pseudocode for slowPath access, a transaction acquires the meta-lock twice. The first time is to detect if the object is being accessed by a synchronized method, and to identify any predecessor transactions that might be active. The second time, after all earlier conflicting transactions have committed or aborted, serves to identify the most recently committed version of the object. A transaction that has acquired the lock twice is referred to as having opened the object.

In the first pass, the transaction acquires the meta-lock and traverses the list, collecting any active transactions into a private set. The transaction then appends its record to the list and releases the meta-lock. At this point, the transaction can choose to abort earlier active transactions by applying CAS to their status words, or it can simply choose to wait for them to become inactive. Waiting could be accomplished by spinning, or by using the predecessor's condition variables just as in the original meta-lock construction.

Once all the prior transactions are committed or aborted, the transaction reacquires the meta-lock to discover the most recently committed object version. After validating itself, there are three possible cases.

1. If the first element on the list is an aborted transaction whose oldPointer is NULL, then the transaction's old version is also the object's current version.
2. If the first element on the list is an aborted transaction whose oldPointer is not NULL, then the transaction's old version is the aborted transaction's oldPointer.
3. If the first element on the list is a committed transaction, then the transaction's old version is the committed transaction's newPointer.

Since the transaction self-validates before acquiring the lock for the second time, the transaction knows that it is in the list, and that it is not the first. Any intervening operations did not empty the list. In other words, there are two situations that cannot occur after self-validation. First, the list cannot be empty. The transaction record was in the list the first time the meta-lock was acquired, so if it was removed, then the transaction would have been aborted, and validation would fail. Second, the transaction's own record cannot be at the head of the list. The first time the meta-lock was acquired, there were other records in the list, and no other transaction would have removed the last of those.

This protocol maintains the desired invariant that there is at most one committed transaction in the list, and that transaction's entry is in first position. After the transaction's entry becomes first in the list, and after releasing the meta-lock, the transaction copies the old version to its new version. If a synchronized method modified the old version while the copy is in progress, then it must first have aborted the transaction, which is why the transaction is validated before the copy is used.

Figure 5:
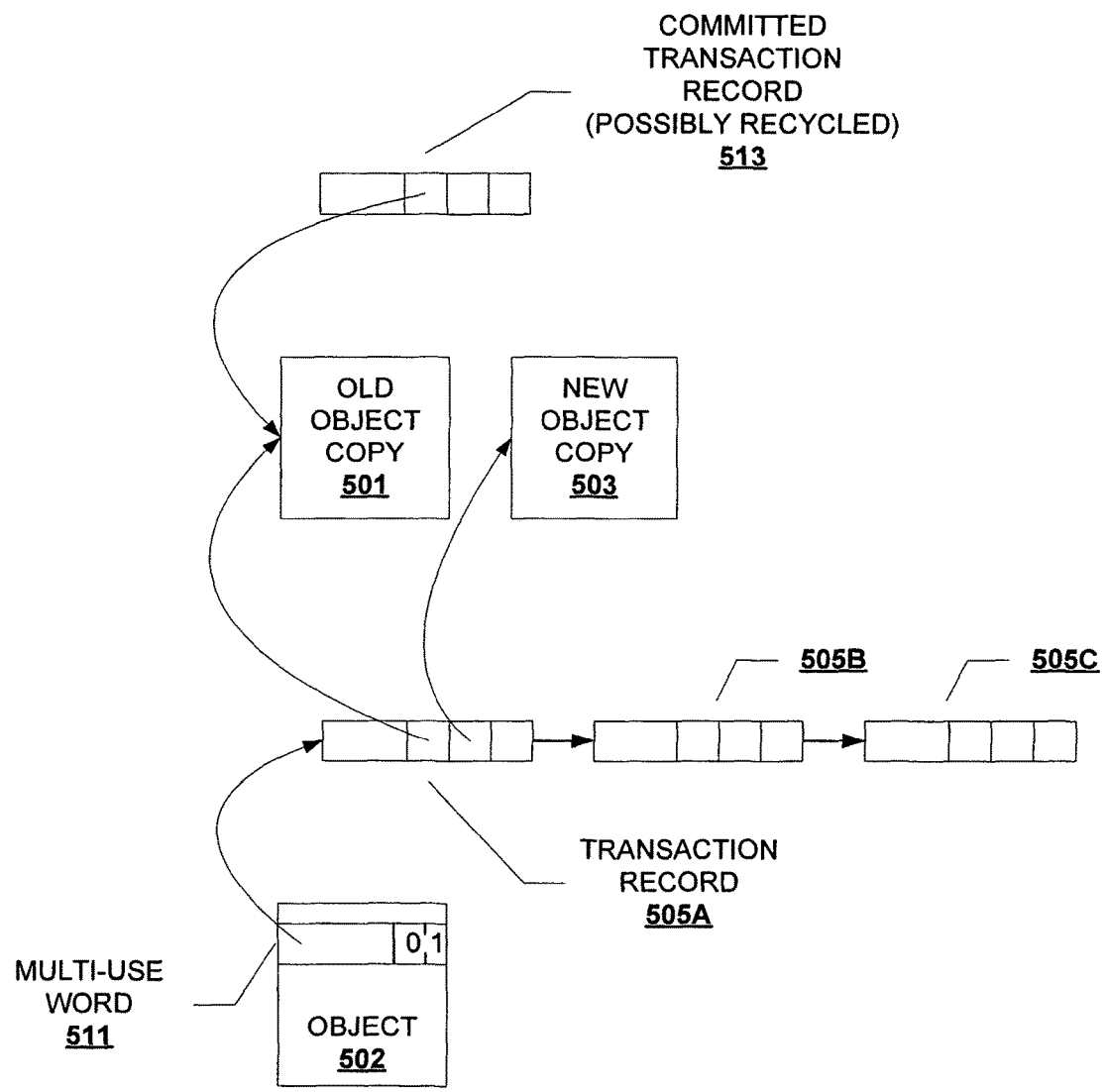
FIG. 5 depicts an exemplary list of transaction records that correspond to transactions waiting on an object when there is a prior committed transaction.
Figure 6:
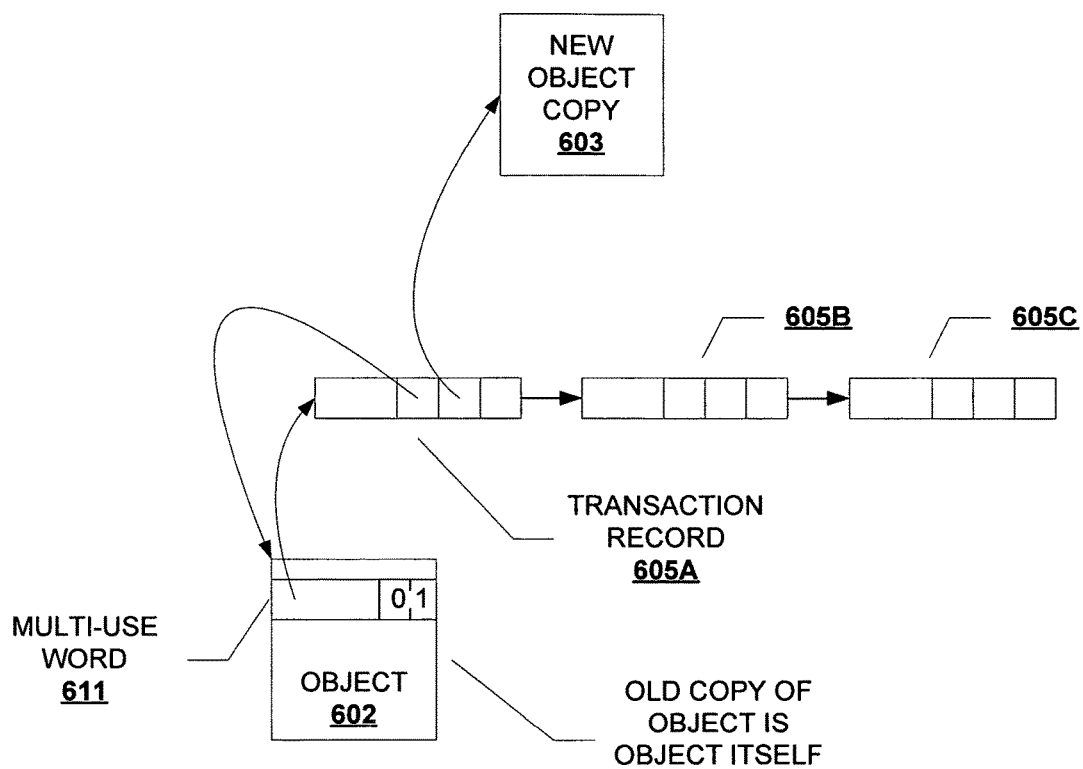
FIG. 6 depicts an exemplary list of transaction records that correspond to transactions waiting on an object when there is no prior committed transaction.

The two typical states of an object accessed by slow-path transactions appear in FIGS. 5 and 6. FIG. 5 depicts an exemplary list of transaction records that correspond to transactions waiting on an object when there is a prior committed transaction. An object 502 includes a multi-use word 511, which indicates a locked access state. The multi-use word 511 references a transaction record 505A, which heads a linked list of transaction records 505B and 505C. The transaction represented by the first transaction record 505A in the list is the transaction that builds a copy of the object state and can then commit. The list of waiting transactions is headed by the transaction record 505A of an active transaction that has its oldPointer pointing to an old object copy 501, which is a prior transaction's copy of the object state. The transaction record's 505A newPointer points to a new object copy 503, which is a new copy of the state on which it will perform its modifications. A committed transaction record 513 (possibly recycled) also references the old object copy 501.

FIG. 6 depicts an exemplary list of transaction records that correspond to transactions waiting on an object when there is no prior committed transaction. An object 602 includes a multi-use word 611, which indicates a locked access state. The multi-use word 611 references a transaction record 605A that corresponds to an active transaction. The transaction record 605A is a head of a linked list of transaction records that also includes transaction records 605B-605C. The oldPointer of the transaction record 605A points to the object 602 itself and its newPointer points to a new copy of the object 603e on which it will perform its modifications. This situation occurs when there was no prior committed transaction's record.

Read-Only Transactions

For read-only access, the transaction record maintains a list of reading transactions. Read-only transactions also operate in two phases. In the first phase, the transaction waits for synchronized methods to clear out as before. Holding the meta-lock, it collects a set of active predecessors, and either adds a new read-only transaction record to the list (if it is the only reader), or adds itself to the set of readers on an existing record.

After all prior active writer transactions have committed or aborted, the read transaction enters the second phase, discovering the most recently committed version of the object, as discussed above. Unlike write transactions, though, read-only transactions do not copy the object.

Note that when a writer transaction collects its active predecessors, it includes all active readers. Synchronized methods prepare to encounter transactional records. An approach is to define a preprocessing stage that takes place in the slow-path immediately after acquiring the meta-lock. The preprocessing stage aborts any active transactions (including active readers), finds the most recently committed version, if any, and copies it back to the object itself, thus removing all transactional records from the list. The synchronized method may then continue as before. As a result, the list always contains either all synchronized methods, or all transactions.

In the most common cases, where contention is low or non-existent, meta-transactions are space and time-efficient. In addition, meta-transactions are compatible with standard Java synchronized methods. There are many other ways than those described above that synchronized methods and transactions might interact. Some simple illustrations have been provided to aid in understanding the described invention and avoid obfuscating the described invention. It is noteworthy that the described meta-transactional synchronization is designed so that all copying of the object is done outside the meta-lock. Therefore, object size has no effect on the time the meta-lock is held.

Constant Meta-Locking

To make meta-transactional synchronization compatible with EVM, the stated lock record list structure of EVM is followed. The stated lock record list structure of EVM maintains a list whose oldest record is pointed to from the object's multiuse word. However, the meta-lock might be held for a number of steps that is proportional to the number of concurrent transactions on an object, since the list is traversed to insert a new transaction record. Although this number is expected to be low by way of good algorithm design, traversal can be eliminated altogether. Meta-locks can be held for a constant number of steps independent of concurrency by making a set of simple modifications to the stated EVM locking scheme.

Meta-transactional synchronization employs minimal meta-locking (locking on the implementation level), and keeps meta-lock acquisitions short (e.g., few instructions) in all but extreme cases. This short meta-lock acquisition allows implementation of meta-transactional synchronization as non-blocking (e.g., with lock-elision) with hardware transactional synchronization. In fact, the complexity of all meta-lock acquisitions can be constrained to small constants, that is, independent of the number of threads, the level of contention, or the size of objects.

Independently of the number of threads, the size of objects, or the number of concurrent transactions accessing a location, meta-transaction synchronization realizations can allow locks to take a constant number of operations. This will also make it directly compatible with hardware based transactional mechanisms which will most likely be limited to some constant size.

A third reserved tailPointer word is added to each object. This word will contain a pointer to the tail of the transaction record list. New transaction records are added using a compare-and-swap operation on the tailPointer just as in the MCS queue-lock algorithm as described in *Algorithms for Scalable Synchronization on Shared-Memory Multiprocessors* by J. M. Mellor-Crummey and M. L. Scott. Instead of the following SlowPath pseudocode,
acquire (meta-lock);
Traverse list of transRecords starting from multiuseword;
Record active transactions in set;
Append transRecord to end of list;
release (meta-lock);
exemplary pseudocode for constant operations meta-locking is as follows,
t=tailPointer;
CAS tailPointer to point to new transRecord;
if t is null then
　set multiuseword to point to transRecord
else // t is a record in the list from the multiuseword
　set t to point to the new transRecord;
Traverse list of transRecords from multiuseword until new transRecord;
Record active transactions in set;

This modification effectively eliminates the need to use meta-locking to insert an item to the list and traverse it to build the list of records. The lock-free traversal of the list starting at the multiuse word is standard linked list based traversal which requires only that garbage collection is aware and elements pointed to by a thread are not collected while they are still accessible. The remaining role of the meta-lock is to perform validation and setup of the transaction record as the first record in the list pointed by the multi-use word pointer. Note that this requires holding the meta-lock for a fixed number of steps independent of the number of transactions active on the object.

Replacing Meta-Locks with Hardware and Word-Level Hybrid Transactional Mechanisms As already stated, meta-transactional synchronization employs minimal meta-locking (locking on the implementation level), and keeps meta-lock acquisitions short (e.g., few instructions) in all but extreme cases. This short meta-lock acquisition allows implementation of meta-transactional synchronization as non-blocking (e.g., with lock-elision) with hardware transactional synchronization. In fact, the complexity of all meta-lock acquisitions can be constrained to small constants, that is, independent of the number of threads, the level of contention, or the size of objects. This will allow direct replacement of lock acquisitions with hardware transactions to provide an obstruction-free transactional mechanism.

In addition, meta-transactional synchronization minimally impacts synchronized methods. The interaction between synchronized methods and transactional methods is handled by having a synchronized method acquire the meta-lock, simply abort any active transaction it encounters ahead of it in the locks transaction record list, and proceed as before. One justification for this approach is that trans-actions may be used for lock elision, and if a synchronized method and a transaction conflict, it is probably because the transactions have been unsuccessful and the client has switched to synchronized methods in place of transactions.

The hardware based dynamic transactional shared memory described in *Software Transactional Memory for Dynamic-sized Data Structures* will in many cases be sufficiently wide (allow atomic access to sufficiently many locations) to allow all transactional locations to be updated atomically. However, there will most likely be a non-negligible number of transactional methods which require more locations than supplied by such hardware. The goal of a hybrid transactional system is to attempt to first execute a transaction that is sufficiently short in hardware, and default to using software if this transaction fails because it tried to access too many locations.

Meta-transactional synchronization combines with hardware transactional support in a natural way by requiring hardware support only to replace meta-locking operations. A feature of meta-transactional synchronization is that all locks are held for short durations. Implementations of meta-transactional synchronization have been described that provide for the meta-lock to be held for a duration that depends on the number of contending transactions on a given object. Implementations of meta-transactional synchronization have also been described that provide for the meta-lock to be held for a small constant independent of contention for the object. Given a hardware transactional mechanism, even one on a very small number of locations, meta-locks can be replaced and transactions provided that are obstruction free. One challenge typically present with suggested combined hardware/software transactional schemes is that hardware transactions need to be made "aware" through some hardware mechanism that there are contending software transactions.

In both previously described implementations of meta-transactional synchronization, various techniques can be utilized to remove locking. One approach is to use low level hybrid transactional techniques. Another appealing approach is using a lock-elision approach. First try the sequence of operations performed under the meta-lock as a transaction (hardware or hybrid), and if it does not succeed proceed to acquire the meta-lock.

Memory Management

In meta-transactional synchronization a modifying transaction (not a read-only transaction) creates a copy of each object it accesses. In realizations, a specialized recycling scheme is avoided to unify and simplify memory management. Instead of a specialized recycling scheme, all transactional and object copy records can be allocated on the memory heap. The JVM is assigned the responsibility of performing garbage collection on the heap. Although this may prove slightly more costly, it significantly simplifies the overall scheme and will allow easier incorporation into existing JVM designs.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
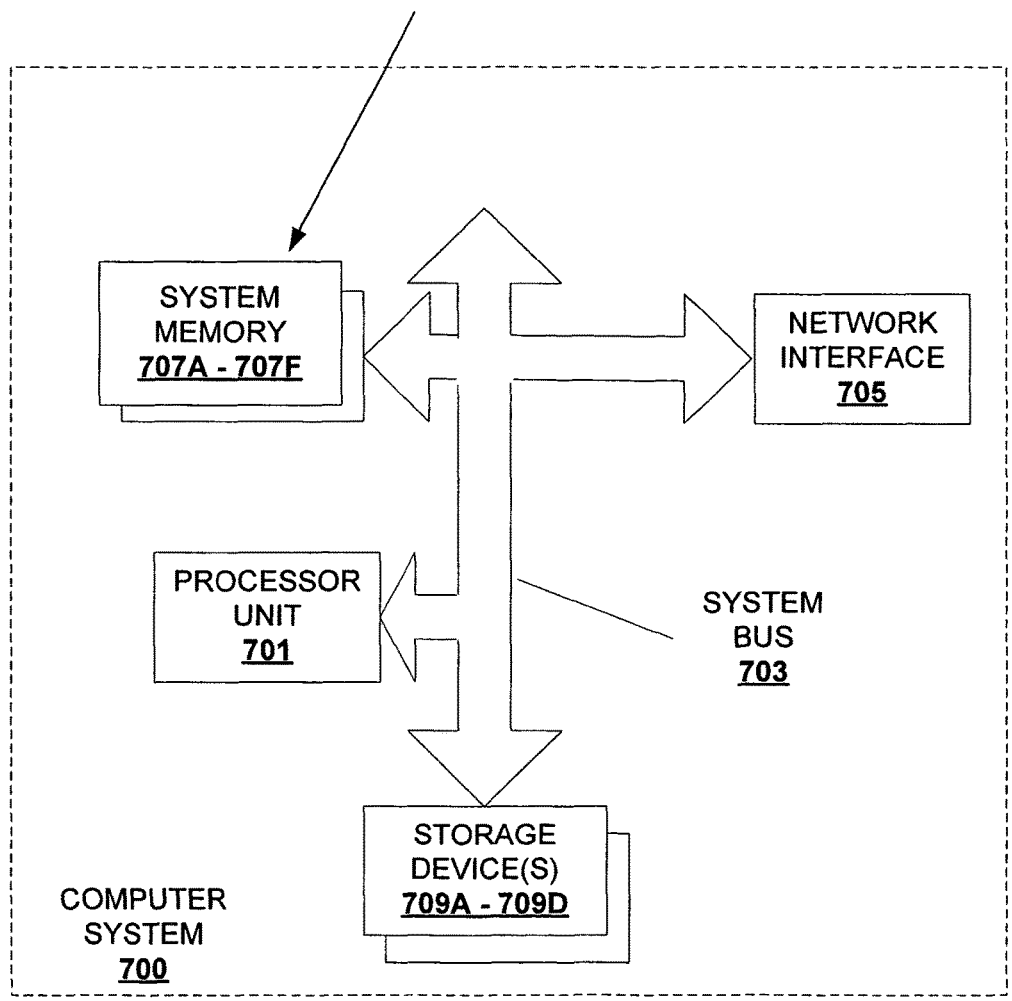
FIG. 7 depicts an exemplary computer system according to realizations of the invention.

FIG. 7 depicts an exemplary computer system according to realizations of the invention. A computer system 700 includes a processor unit 701 (possibly including multiple processors). The computer system 700 also includes a system memory 707A-707F (e.g., one or more of cache, SRAM DRAM, RDRAM, EDO RAM, DDR RAM, EEPROM, etc.), a system bus 703 (e.g., LDT, PCI, ISA, etc.), a network interface 705 (e.g., an ATM interface, an Ethernet interface, a Frame Relay interface, etc.), and a storage device(s) 709A-709D (e.g., optical storage, magnetic storage, etc.). Realizations of the invention may include fewer or additional components not illustrated in FIG. 7 (e.g., video cards, audio cards, additional network interfaces, peripheral devices, etc.). The processor unit 701, the storage device(s) 709A-709D, the network interface 705, and the system memory 707A-707F are coupled to the system bus 703. The system memory 707A-707F embodies an implementation of meta-transactional synchronization.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A non-transitory, computer-readable storage medium storing program instructions computer-executable to implement:
    a shared object in an object-oriented language, wherein the shared object is accessible by a plurality of concurrently executing atomic transactions; and
    a particular atomic transaction of the plurality of concurrently executing atomic transactions, wherein the particular atomic transaction comprises an access directed to the shared object and one or more accesses directed to one or more other objects;
    wherein the shared object comprises at least one header word storing information indicating whether one or more of the concurrently executing atomic transactions is attempting to access the shared object; and
    wherein the particular atomic transaction is configured to:
        determine, based on the at least one header word of the shared object, if the shared object is being accessed; and
        in response to determining that the shared object is not being accessed:
            modify a working copy of the shared object,
            access the one or more other objects, and
            commit the particular atomic transaction, wherein the working copy becomes the current shared object.

2. The storage medium of claim 1, wherein the at least one header word in the shared object indicates a lock state.

3. The storage medium of claim 2, wherein the lock state is in accordance with at least one of a meta-lock mechanism, a thin lock mechanism, or a relaxed lock mechanism.

4. The storage medium of claim 1, wherein the particular atomic transaction is further configured to:
    in response to determining that the shared object is not being accessed:
        acquire a lock on the shared object prior to modifying the working copy of the shared object.

5. The storage medium of claim 1, wherein the particular atomic transaction is further configured to copy the shared object to make the working copy.

6. The storage medium of claim 4, wherein the particular atomic transaction is further configured to release the acquired lock after committing the transaction.

7. The storage medium of claim 4, wherein the particular atomic transaction is configured to, in response to determining that the shared object is being accessed:
    acquire a lock on the shared object and determine other computations accessing the shared object and active predecessor computations,
    release the lock,
    reacquire the lock and determine a most recent committed version of the shared object, and
    modify the determined most recent committed version of the shared object.

8. The storage medium of claim 7, wherein the other computations or active predecessor computations include other executing atomic transactions of the plurality of concurrently executing atomic transactions or executing synchronization methods.

9. The storage medium of claim 7, wherein said modifying the determined most recent committed version of the shared object comprises making a working copy of the shared object.

10. The storage medium of claim 1, wherein the shared object is implemented as non-blocking with lock-elision.

11. The storage medium of claim 1, wherein the shared object is implemented as obstruction free.

12. The storage medium of claim 11, wherein the shared object is implemented as obstruction-free with dynamic shared transactional memory or word-level hybrid transactional memory.

13. A method, comprising:
    performing, by a computer:
        coordinating transaction-based access to a concurrently accessible object by concurrently executing transactions, wherein one or more methods for transaction-based access to the object are identified by a source-level programming language construct in an object-oriented programming language;
        wherein coordinating transaction-based access to the object comprises an atomic transaction of the concurrently executing transactions performing:

determining whether the object is being accessed; and in response to determining that the object is not being accessed:
modifying a working copy of the object;
accessing one or more other objects; and
committing the atomic transaction, wherein said committing is performed subsequent to said modifying and subsequent to the accessing the one or more other objects, wherein the working copy becomes the current shared object.

14. The method of claim 13, wherein the construct defines at least one header word of the object.

15. The method of claim 14,
wherein the header word of the object implements at least one of: meta-locks, relaxed-locks, or thin-locks; and
wherein the header word of the object comprises an indication of an access state and transaction information usable in coordinating concurrent transaction-based access to the object.

16. The method of claim 13, wherein the one or more methods are configured to indicate an access state and a reference to one or more transaction records associated with the object.

17. The method of claim 16, wherein each of the transaction records indicates a type of transaction, an indication for the transaction's status, a reference to a backup instance of the object, and a pointer to a working instance of the object.

18. The method of claim 17, wherein each of the transaction records further indicates a reference to a list of read transactions on the object.

19. The method of claim 13, wherein the programming language includes Java.

20. A non-transitory, computer-readable storage medium storing program instructions computer-executable to implement:
a definition of a shared object in an object-oriented language that is able to be instantiated in memory to create one or more instances of the shared object, wherein each shared object instance comprises a header word, and wherein each shared object instance is configured to be accessible by a plurality of concurrently executing atomic transactions;
a definition of a source-level programming language construct that is able to be instantiated in memory to create one or more instances of one or more methods for transaction based access of an instance of the shared object by the plurality of concurrently executing atomic transactions, wherein the definition of the source-level programming language construct is included in an application programming interface, wherein each of the instances of the one or more methods is dependent on information stored in the header word of the shared object instance indicating whether one or more of the plurality of concurrently executing atomic transactions is attempting to access the shared object instance; and
wherein, in response to an attempt to access an instance of the shared object by one of the plurality of concurrently executing atomic transactions via the application programming interface, an instance of one of the one or more methods is configured to:
determine, based on the header word of the instance of the shared object, if the instance of the shared object is being accessed; and
in response to determining that the instance of the shared object is not being accessed:
modify a working copy of the instance of the shared object; and
access one or more other objects.

21. The computer-readable storage medium of claim 20, wherein the program instructions are further computer-executable to implement a third definition of a source-level programming language construct that is able to be instantiated in memory to create one or more instances of one or more synchronization methods that utilize lock monitor mechanisms dependent on the information stored in the header word of a shared object instance to control access to the shared object instance.

22. The computer-readable storage medium of claim 21, wherein the lock monitor mechanisms include at least one of meta-locking, relaxed locking, and thin-locking.

23. The computer-readable storage medium of claim 20, wherein the program instructions comprise a functional sequence that defines one or more operations for writing transaction information into the header word of an instance of the shared object and generating one or more transaction records.

24. The computer-readable storage medium of claim 23, wherein the transaction information is a reference to a set of transaction records.

25. An apparatus, comprising:
one or more store elements;
means for instantiating one or more concurrently accessible objects in the store elements; and
means for performing source-level transaction-based accesses of the concurrently accessible objects in accordance with one or more methods defined in an object-oriented programming language;
wherein performing a source-level transaction-based access of a given concurrently accessible object comprises an atomic transaction invoking the one or more methods to implement:
determining based on at least one header word whether the object is being accessed; and
in response to determining that the object is not being accessed:
modifying a working copy of the object;
perform one or more access operations targeting one or more other objects; and
committing the atomic transaction, wherein said committing is performed subsequent to said modifying the working copy of the object and subsequent to the performing the one or more access operations, wherein the working copy becomes the current shared object.

26. The apparatus of claim 25, further comprising means for the allowing acquisition of meta-locks on the one or more objects within a constant number of operations.

27. The apparatus of claim 25, further comprising means for accessing the one or more objects without blocking.

28. The apparatus of claim 25, wherein the programming language includes Java.

* * * * *

UNITED STATES PATENT AND TRADEMARK OFFICE
CERTIFICATE OF CORRECTION

PATENT NO. : 10,049,127 B1
APPLICATION NO. : 10/995885
DATED : August 14, 2018
INVENTOR(S) : Shavit et al.

It is certified that error appears in the above-identified patent and that said Letters Patent is hereby corrected as shown below:

In the Drawings

On sheet 3 of 9, in FIG. 3, under Reference Numeral 319, Line 1, delete "COMMITT" and insert -- COMMIT --, therefor.

On sheet 6 of 9, in FIG. 4C, under Reference Numeral 459, delete "COMMITT" and insert -- COMMIT --, therefor.

In the Specification

In Column 3, Line 54, after "Scherer", delete "N" and insert -- IV --, therefor.

In Column 4, Line 47, after "transaction" insert -- . --.

In Column 5, Line 61, delete "slowPath" and insert -- SlowPath --, therefor.

In Column 5, Line 62, delete "slowPath." and insert -- SlowPath. --, therefor.

In Column 6, Line 22, delete "slowpath" and insert -- SlowPath --, therefor.

In Column 6, Line 57, delete "slowPath" and insert -- SlowPath --, therefor.

In Column 7, Line 37, delete "slowPath" and insert -- SlowPath --, therefor.

In Column 7, Line 40, delete "slowPath" and insert -- SlowPath --, therefor.

In Column 7, Line 59, delete "slowPath" and insert -- SlowPath --, therefor.

In Column 8, Line 57, delete "slowPath" and insert -- SlowPath --, therefor.

Signed and Sealed this
Twenty-first Day of May, 2019

Andrei Iancu
*Director of the United States Patent and Trademark Office*